United States Patent [19]

Tubman et al.

[11] Patent Number: 5,569,038
[45] Date of Patent: Oct. 29, 1996

[54] ACOUSTICAL PROMPT RECORDING SYSTEM AND METHOD

[76] Inventors: Louis Tubman, 1420 Locust St., Suite 8-F, Philadelphia, Pa. 19102; Daniel W. Gravereaux, 602 Carter St., New Canaan, Conn. 06840

[21] Appl. No.: 148,626

[22] Filed: Nov. 8, 1993

[51] Int. Cl.⁶ ...................................................... G09B 5/00
[52] U.S. Cl. ..................... 434/308; 434/156; 434/307 A; 84/634
[58] Field of Search ..................................... 434/156, 157, 434/185, 307 R, 308, 307 A, 318–321, 365; 84/477 R, 601, 602, 609, 610, 625, 626, 633, 634, 659, 641, 645; 348/484, 738; 358/341; 369/48; 360/22, 49, 69, 70; 379/88, 196, 210, 211, 265, 266

[56] References Cited

U.S. PATENT DOCUMENTS

| | | | |
|---|---|---|---|
| 3,194,895 | 7/1965 | Treadwell | 434/321 X |
| 3,913,135 | 10/1975 | Damlamian | 434/308 X |
| 3,955,466 | 5/1976 | Goldmark | 434/319 X |
| 4,139,954 | 2/1979 | Yamamato . | |
| 4,354,841 | 10/1982 | Meeder . | |
| 4,710,130 | 12/1987 | Aarons | 434/319 X |
| 4,855,844 | 8/1989 | Snodgrass . | |
| 5,046,004 | 9/1991 | Tsumura et al. | 84/601 X |
| 5,053,891 | 10/1991 | Snodgrass . | |
| 5,194,682 | 3/1993 | Okamura et al. | 84/625 |
| 5,247,126 | 9/1993 | Okamura et al. | 84/609 |
| 5,270,476 | 12/1993 | Rokkaku et al. | 84/601 X |
| 5,294,745 | 3/1994 | Yamauchi et al. | 84/601 |

Primary Examiner—Joe Cheng
Attorney, Agent, or Firm—Aquilino & Welsh

[57] ABSTRACT

A recording method and system that provides optional and controllable song lyric acoustical promptings and music for Karaoke participants which is also capable of providing phonetic instruction for formative bilingual skill development. The acoustical prompts are in the form of short spoken phrases, acoustically provided just prior to the time at which the actual vocal should be sung. The method of acoustical prompting employs a listen—sing-along procedure effected via the interaction of the spoken instructor-promptings and the Karaoke participant. The acoustical system includes preparing a multi-track recording in proper time sequence to provide a precedent acoustical prompt. For example, the recording could have stereo music on two tracks, an original vocal on a third track in synchronism with the music, and on a fourth track rapidly spoken prompt messages preceding respective portions (vocal lines) of the original vocal. The recording may be played back in a predetermined sequence into an electronic mixer for controlling the sound level of each track, communicating the rapidly spoken prompt messages by acoustical means directly to a Karaoke participant for the purpose of enabling the participant to sing a rendition associated with the said audio vocal prompt by repeating and singing the prompt message accordingly with the melody of the original vocal line, feeding the participant's rendition into the mixer for producing the participant's rendition of the vocal in accompanying relationship with the music and/or the original vocal, and controlling the volume level of the original vocal relative to the volume level of the participant's rendition. This acoustical method and system of song lyric and language prompting significantly facilitates both the amateur and/or professional user with a simple to use, listen and sing-along, interactive procedure.

21 Claims, 9 Drawing Sheets

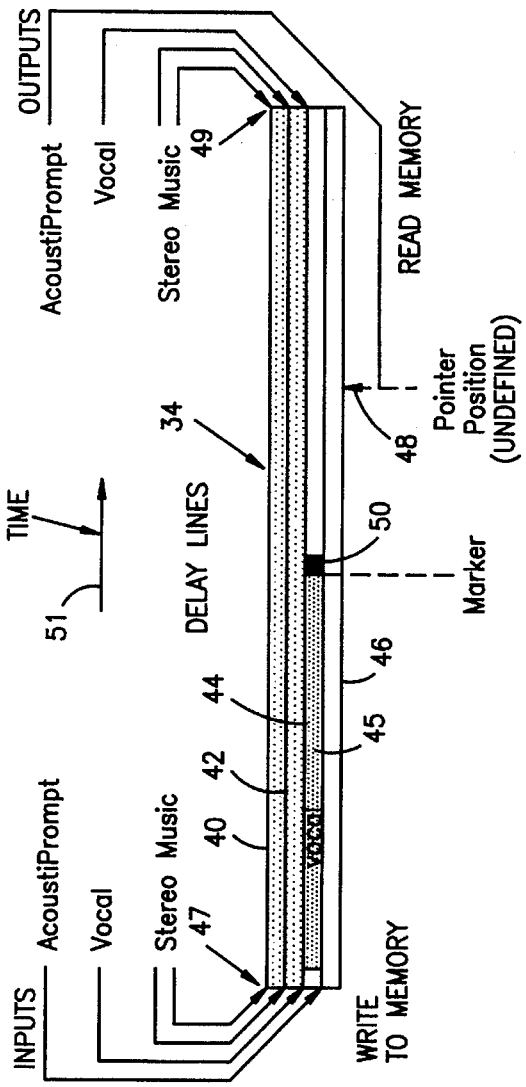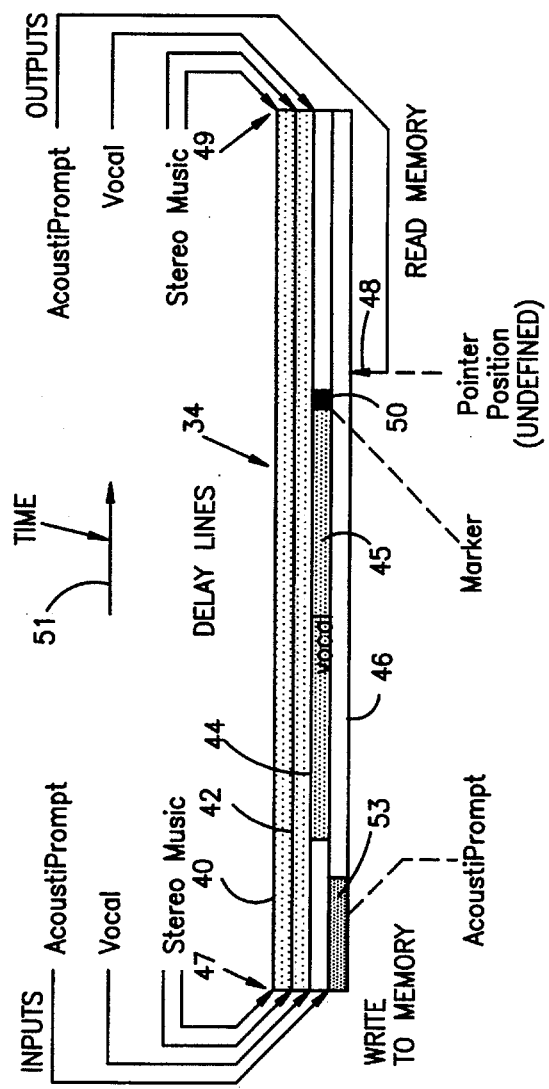

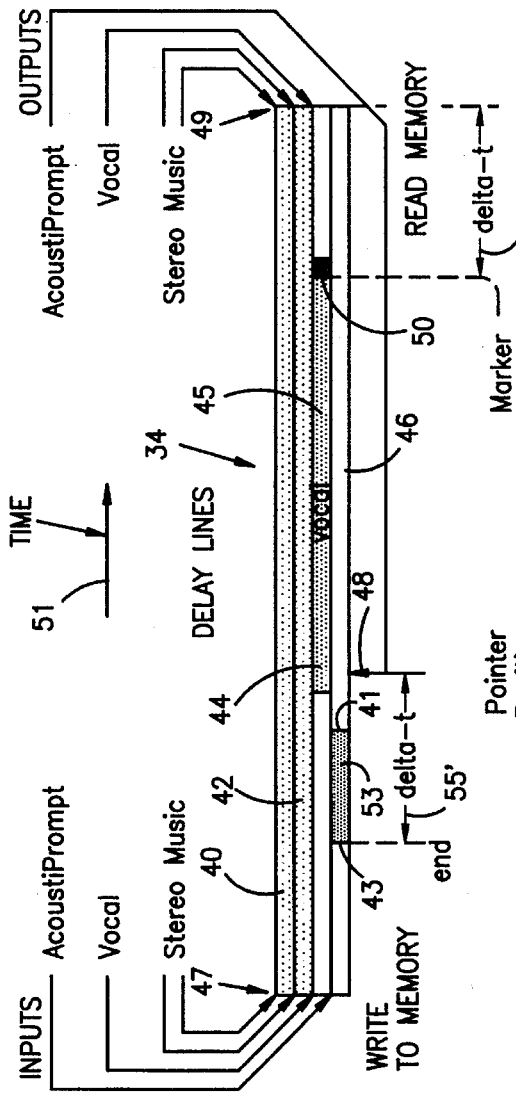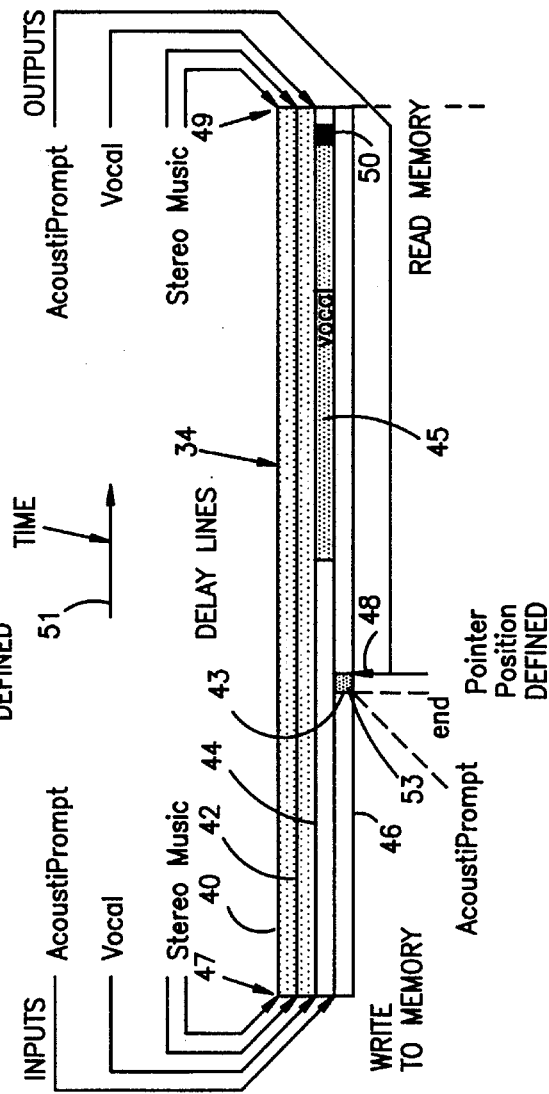

ACOUSTICAL PROMPT RECORDING SYSTEM AND METHOD

BACKGROUND OF THE INVENTION

1. Field of the Invention

This invention relates to a "Karaoke" sing-along method and system. More particularly, the invention relates to a method and system using acoustical prompting rather than visual prompting.

2. Description of Related Art

"Karaoke" is the name given for the activity wherein a person sings and/or performs a "vocal" along with prerecorded music that is being played. "Karaoke" literally means "false orchestra" in the Japanese language. Karaoke is also the Japanese trade word applied to "sing-along" products, and is universally used to describe singing along with prerecorded music for enjoyment or practice.

When performing Karaoke, participants must either know the lyrics by memory or read the lyrics from a song sheet or electronic prompter. Current visual prompting methods are solely dependent upon the participant's ability to read, and then in turn efficiently synchronize and sing the words in a melodic, artistic, and timely manner with the ongoing musical background track.

Although visual prompting is the universal standard, and continues to be very popular in the Eastern and Oriental cultures, the visual prompting technique imposes restrictive, awkward and even prohibitive requirements on the Karaoke participant. These impositions greatly degrade the potential performance necessary for faithful reproduction of a Western world pop music performance. Should a participant wish to emulate a particular rendition, they must not only emulate the vocal performance, but also the visual aspects of the participant's movements. The visual prompting method is severely restrictive with respect to certain subtleties of performance such as phrasing, expression, styling and bodily movement.

As used herein: a "song" means "music", plus "vocal", plus sometimes there is a "choral background". "Music" is orchestral portions. "Vocal" is intended to mean the lyrics being sung by the lead vocalist. "Choral background" is intended to mean choral accompaniment being presented along with the "music". Thus, "music" as used herein may include "choral background". "Vocal line" means a segment (portion) of the vocal as distinct from the entire vocal.

Karaoke is performed for enjoyment, personal challenge, competition, and practice. Participants seek to demonstrate artistic creativity and to copy renditions made popular by familiar or famous vocalists. Popular music without a vocal is usually played. A Karaoke participant then picks up a microphone and sings the vocal along with the music. The participant's voice is broadcast to a listening audience by the same loudspeaker equipment through which the music is played. The participant's vocal rendition plus the music can be recorded as a complete song which can be played later. For those who like to sing, Karaoke is fun. It is also a challenge for all forms of singing and performing competitions. Most importantly, though, Karaoke is a method of practice that is enjoyable, affordable, and can even be performed alone.

Prompting methods for a Karaoke participant normally involve visual techniques. The lyrics may be presented from a video monitor, a teleprompter, or from written music. These present methods require that the Karaoke participant continuously read the words, thereby restricting the participant from full artistic expression, because their eyes must remain focused on the visual prompts. These visual prompting methods for presenting written lyrics do not effectively convey to the Karaoke participant(s) any indication of the creative vocalizing artistry originally employed by a renowned vocalist who may have made famous that particular song.

Various prior art devices have been developed to convey audio information to a user in a useful manner. U.S. Pat. No. 4,353,841 to Meeder, for example, teaches a system in which two tracks have staggered prerecorded sections, and each track has associated therewith respective continuous recordings of background sounds.

U.S. Pat. No. 4,139,954 to Yamamoto discusses staggering one track relative to another track. The information on one track is discussed as being questions, while another track has answers to the questions. The answers and questions are staggered in time relative to each other.

U.S. Pat. No. 4,354,841 to Meeder discusses a tape having tracks respectively dedicated to background music, first phrases, and second phrases associated with the first phrases. The phrases are staggered relative to each other.

U.S. Pat. No. 4,855,844 to Snodgrass suggests a tape format in which the tape can be played nearly continuously, with the exception of a single stereo channel change.

U.S. Pat. No. 5,053,891 to Snodgrass teaches a system in which four consecutive segments of information are recorded on each respective channel. The first segment is recorded in the first stereo channel of one direction, the second segment is recorded in the first stereo channel of the reverse direction, this third segment is recorded in the second stereo channel of the one direction, and the fourth segment is recorded in the second stereo channel of the reverse direction. This allows the user to consecutively play all four segments while only having to change the stereo channel selection once.

SUMMARY OF THE INVENTION

It is an object of the present invention to provide a Karaoke method and system which overcomes some of the problems mentioned above with respect to the prior art.

It is another object of the invention to provide a Karaoke method and system which provides a non-visual prompt to a Karaoke participants.

It is yet another object of the invention to provide a Karaoke method and system which provides an acoustical prompt to the Karaoke participant.

These and other objects are carried out by a recording system which records acoustical prompts associated with a particular music piece.

The present invention uses an acoustically-supplied prompt instead of a visual one. Musical lyrics are presented to a Karaoke participant through a prompt which leads in time the vocal associated with the musical accompaniment. The prompt includes relatively short segments of the lyrics (words) of a vocal of a song audibly acoustically communicated to the participant immediately preceding the moment in which the respective segment (vocal line) of the vocal is to be sung. The participant simply sings the words he/she has just heard. The participant's body motion is not constricted to, restricted by, or fixed on an area of a visual prompt device, nor are the participant's eyes confined to focusing on a video monitor or any other visual teleprompter device. The acoustically-supplied spoken prompt may be presented to the participant via earphones or small loudspeakers mounted adjacent to his/her ears. In this manner others who are viewing the performance do not hear the acoustical prompt.

An acoustical prompt makes Karaoke possible in an automobile or any place where a visual prompt cannot be used, or would be impractical. For example, the participant may enjoy Karaoke in an automobile where it is isolated and private. Furthermore, the driver and/or the passenger may enjoy simple singing-along in a direct acoustical manner, without a microphone or recording function. This simple, yet satisfying, sing-along interactive participation in the automobile can, in and of itself, provide a musical experience for all participants.

In one illustrative embodiment, a method is provided for an acoustical spoken prompt for a Karaoke performance comprising the steps of preparing, for example, a four-track recording in proper time sequence of music (possibly including choral background) in stereo on first and second tracks, an original vocal for the song on a third track in time synchronism with the music on the first and second tracks, and on a fourth track a rapidly rendered spoken vocal prompt, with each prompt including a relatively short segment (vocal line) of the lyrics of a song adapted to be acoustically communicated to a participant in advance of respective phrases of the lyrics of an original vocal.

This method includes the steps of playing back the recording in a predetermined time sequence into an electronic mixer for controlling the volume level of each track, acoustically communicating the spoken prompt on the fourth track to a Karaoke participant for enabling the participant to sing a vocal rendition related to said spoken prompt, microphonically feeding the participant's rendition of the vocal into the mixer for creating the participant's rendition of the song, including vocal and music.

The apparatus and method disclosed herein is useful not only for enjoying a sing-along, but also useful for memorizing lyrical content.

BRIEF DESCRIPTION OF THE DRAWINGS

The invention, together with further aspects, objects, features and advantages thereof will be more clearly understood from the following description considered in connection with the accompanying drawings in which like elements bear the same reference numerals throughout the various Figures.

FIG. 2 depicts diagrammatically a step in the recording process of the present Karaoke system wherein the regular vocal has just been placed in the first-in first-out memory.

FIG. 3 depicts diagrammatically a step in a recording process of the present invention wherein the Acoustiprompt is being placed in the first-in first-out memory.

FIG. 4 depicts diagrammatically a step in a recording process of the present invention wherein a determination of when to read the Acoustiprompt is being made.

FIG. 5 depicts diagrammatically a step in a recording process of the present invention wherein the Acoustiprompt is almost entirely read out of the first-in first-out memory.

DESCRIPTION OF THE PREFERRED EMBODIMENTS

Figure 1:
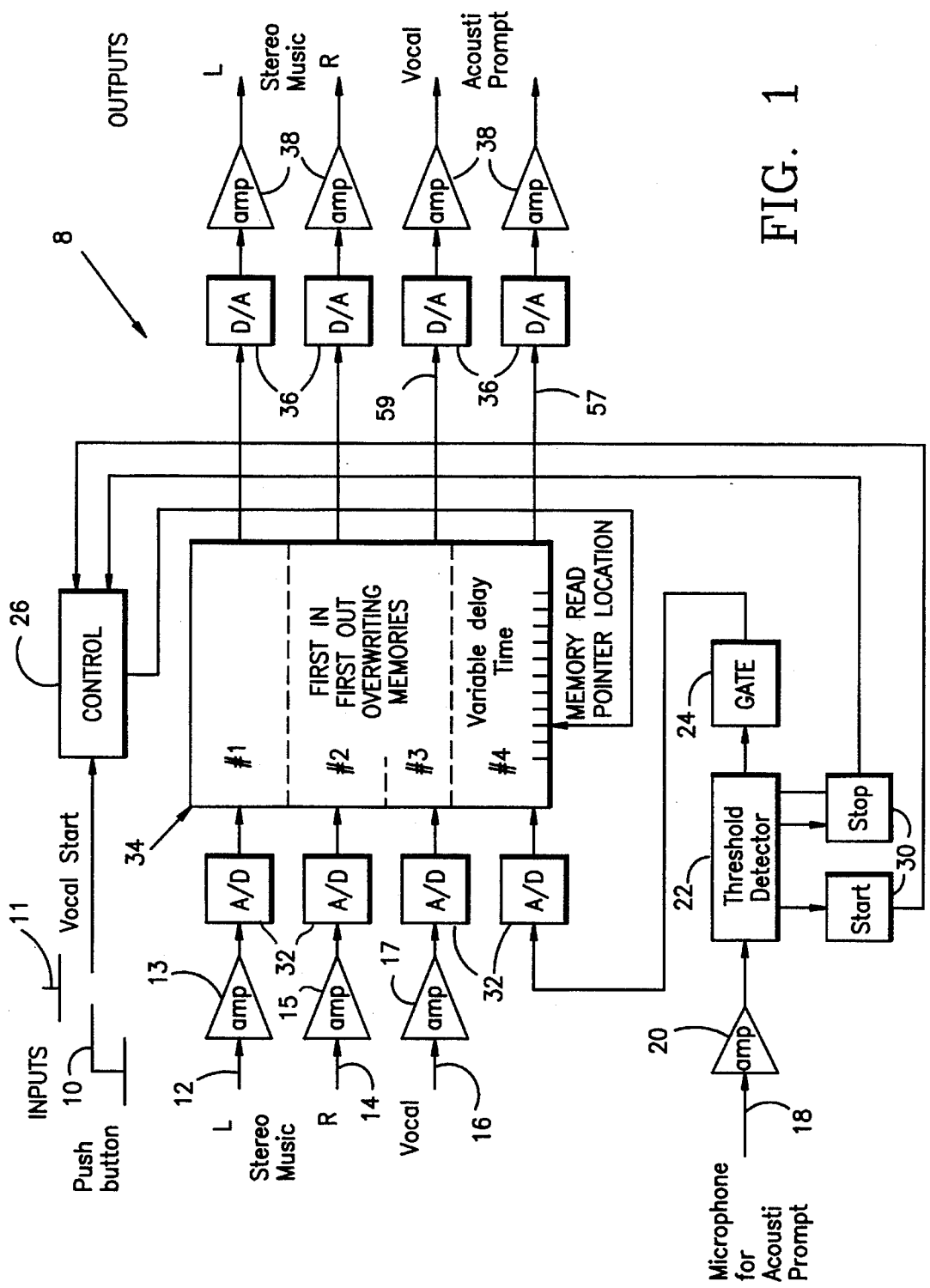
FIG. 1 is a functional block diagram of an AcoustiPrompt recording system.

The overall concept around which the systems and methods discussed below are based will be occasionally referred to as "Acoustiprompt." As used herein, the term "indicia" is intended to convey identifiable segments of recorded information, including stopping and starting areas.

While the discussion below may discuss a variety of embodiments, it is contemplated that the present system could be recorded using even one or two tracks of information. For example, a two track format may have music on one track, or mixed across two, and an Acoustiprompt on one track, or mixed across two tracks.

It should be understood that the invention could be implemented with any number of tracks without departing from the spirit and scope of the invention. It should also be understood that the prompting tracks are not required to be in the same language as the vocals which are associated with the music, or the vocals that are recorded with the music. For example, one track could be an English acoustical prompt, and another track could be a Norwegian acoustical prompt. Or the vocal could be in Spanish, while the acoustical prompting is in the English language.

The present system can also be used with a variety of languages. Such a system and method provides a unique system of teaching bilingual skills via recorded musical selections. It is contemplated that the system could be used in an educational or instructional setting for teaching formative bilingual skills.

The present system also offers certain neurological and intellectual characteristics which are simply not possible with visual prompting methods. Because participants do not have to follow a visual prompt, they are allowed to focus their attention on their bodily movements and facial expressions. The neurological requirements of listening to spoken prompts are much less than the neurological requirements of following a visual prompt. The performance, therefore, can be much more spontaneous.

It is also contemplated that a two track Karaoke system could be used, having the singer and prompter on one track, recorded at different levels, and music on the other track. By using the high and low volumes of the balance control system found on most CD and cassette players, a simulated discrete channelling of the vocalist and the prompter voices may be achieved on one track, while the music continues to be played on the other track.

A rudimentary, formative level of bilingual learning may be achieved by the user/participant by employing foreign language promptings related to ongoing sung and/or prompted lyrics of the song. This bilingual learning process may be enhanced by combining the audio acoustical prompting method of the present invention with standard CD, CD-ROM or video visual prompting methods, particularly laser CD and videographics. The ultimate purpose of using such a system would be to achieve maximum sensory impact, resulting in significantly improved and accelerated recall and retention of words and/or phrases, be they in an indigenous language or in a foreign language.

It should be kept in mind that while the discussion may frequently refer to a single "Karaoke participant," the systems and methods disclosed and claimed herein could be used by any number of participants at the same time, in the spirit of Karaoke.

In the present invention, an acoustical prompt is the utterance of portions of the lyrics, i.e., a vocal line, in relatively short segments (short "messages"). Each "message" of the spoken or sung vocal prompt is a rapid acoustical presentation of a portion of the song's lyrics momentarily before the respective portion of the lyric is to be sung. This "spoken prompt message" contains only the words required to sing the next "vocal line", i.e., the next portion of the vocal, such as a portion until the next moment wherein the singer would inhale. Each such prompt message must be created and added to the music plus vocal at the appropriate time in the creation of a recording in accordance with the present invention. It should be kept in mind that the prompt may be either sung or spoken. Therefore, even though the remaining specification frequently refers to a spoken prompt, it should be kept in mind that the technique or apparatus being discussed could advantageously be carried out using sung prompts, or even a combination of sung and spoken prompts.

The recorded music can be of many formats. Preferably, the music is high quality and presented in stereo on at least two channels. The original vocal should also be presented on at least one additional channel. The spoken prompt is then presented on still another channel. The result is at least a four channel presentation, which may be in the format of a four-track recording.

The tracks may be recorded in a variety of ways. For example, stereo music could be mixed and stored as mono on one track, and the three remaining tracks may respectively carry the vocalist, an indigenous language spoken prompt, and a bilingual spoken prompt.

To create an acoustical prompt Karaoke recording standard multi-track mixing studio procedures can be employed. The music can be prepared as a stereophonic mix-down. The vocal and vocal processing can be prepared as a single mix; it is to be a mix of such a character that would add properly to the music to create a good, complete, stereo song recording.

The preparation of the spoken prompt for vocals involves many steps. First, songs must be prejudged for appropriateness. The lyrics then have to be considered, analyzed and prepared for message, length, and rate of reading. A recording of the spoken prompt is carried out. This spoken prompt is then inserted as brief "messages" inserted into the multitrack recording at respective appropriate times in advance of respective vocal lines of the original vocal. The invention herein describes an apparatus for properly positioning such spoken prompt messages in timed relationship prior to the respective vocal lines.

The result is at least a multi-channel master recording on an appropriate recording medium. For example, the recording could comprise a two-channel format having mono music on one channel, and the acoustical prompt on the other.

Or the format could be four-channel. This four-channel recording may be placed on any of various types of massmarketed media. For example, a compact cassette presently is a four-channel medium, which could be used in the practice of the present invention requiring only a special four-channel playback head. As another example, a digital compact disc contains one hour of two-channels of recorded programming. The data on a digital disc can be partitioned differently to contain one-half hour of four channels; a different laser player would be needed for the four channels. As a third example, presently, an R-DAT digital cassette has a four-channel recording and playback mode built in, and thus an R-DAT player only needs to be engaged in the four-channel mode to be used in the practice of the present invention.

The recording medium may be played back into a device which is able to selectively fade out the AcoustiPrompt. For example, a special electronic mixer/amplifier used with loud speaker equipment could advantageously be employed in order to take full advantage of the AcoustiPrompt system. Each of the four playback channels requires its own preamplifier. The outputs from the music stereo pair feed the mixer section directly and are presented to the output for driving the power amplifier and the loud speaker equipment.

The original vocal is also available for listening to directly or for mixing in with the music channels. The relative level of this original vocal can be adjusted in the mixer section of the apparatus. The spoken prompt for the vocal plays back alone into the mixer section. The spoken prompt can be listened to alone, or mixed in with the music as well as with the original vocal channel. The entire mix is presented to a power amplifier and speakers for listening.

Unlike the visual prompting method, which virtually negates Karaoke participation in an automobile, or with a personal cassette player, the present invention allows participation even in these environments.

In employing the invention, the listening modes advantageously may be varied as desired by the user. First, the musical channels may be played back. The spoken prompt for the vocal may be played next in order to become familiar with the lyrics (words). Then the original vocal can be listened to. Finally, the music alone with the spoken prompts may be played back for the user to sing along with the program. The original vocal may be added in some proportion at some adjusted volume to help the user mimic the original vocal performance. During the various modes of playback, the user may sing along with the music with or without a microphone. The microphone is connected to a suitable mixer, amplifier and loud speakers. In addition, recording the Karaoke performance may be carried out with suitable recording equipment.

THE ACOUSTICAL PROMPT

There are many methods for preparing a Karaoke AcoustiPrompt song recording in a recording studio. Most methods require extensive mixing and editing in a well-equipped studio. The music and vocal channels must be available, preferably as a recording; the vocal channel must be in time synchronism with the music channels. The spoken prompt messages for the vocal (which may be called the "AcoustiPrompt" messages) must be determined; they must be added at the right moments relative to the respective vocal lines and music; and a new recording containing the stereo music, the vocal, and the acoustiprompt messages must be recorded in four discrete channels.

A typical procedure may be as follows. A previously recorded master multi-channel medium (studio analog or digital tape) containing a popular song is played back. It contains numerous channels of the instruments and grouped instruments, vocal and choruses. The channels are presented to the mixing console where the mixing engineer and producer adjust the console faders, channel pan-pots, equalizers, and processing equipment in order to prepare a two-channel mix. The vocal is also mixed down from various vocal channels and processed channels into a single monophonic vocal channel. This typical procedure results in a time-synchronized recording of a stereo pair for the music, and a mono recording of the vocal.

Next, the recording of the AcoustiPrompt messages must be made. An announcer must speak the spoken prompt messages (brief phrased portions of the lyrics) in time-spaced short messages rapidly spoken into a microphone connected to a recorder. The spoken prompt message may be read from a text or music sheet. Preferably, the music is well-known so that the spoken prompt messages provide some intonation indicating the mood and tempo of the song in a manner or character such as may have made the song famous in its original presentation.

The AcoustiPrompt recording must then be added to the stereo and vocal mix using the mixing console and then listened to. Each AcoustiPrompt message must be positioned in a particular location relative to the location of the respective portion of the vocal, e.g., in advance of the appropriate "vocal line", and then reviewed for location of placement, length and time, and freedom from musical interruption. The AcoustiPrompt may also be mixed to overlap the vocal to some extent. This may be required due to the timing of the vocals of the music. Once positioned, timed and edited, the final AcoustiPrompt recording is added to the master tape at proper relative timing and level.

The above procedure requires many steps. Learning the song and lyrics; previewing the timing and placement; saying the spoken prompt messages rapidly; and recording these AcoustiPrompt messages.

Each AcoustiPrompt recorded message must be shuttled into its appropriate place relative to a respective vocal line (portion of the vocal) then it is played back and adjusted in time placement for appropriate Karaoke performance. Once finalized, the AcoustiPrompt messages must be recorded on the master recording. Each message of the spoken prompt is to be positioned in appropriate time relative to the vocal channel by listening repetitively and rerecording on the master tape just at the right moment. Any sound enhancement of the AcoustiPrompt messages desired may be carried out in the mixing console.

This procedure is easily carried out at most recording studios. However, it is a time consuming process that requires considerable time, skill, listening, mixing and editing.

ACOUSTIPROMPT RECORDING APPARATUS

The recording of the acoustical prompting Karaoke tape could, in addition to the technique discussed above, be carried out using specially designed equipment designed to make such a recording. This equipment makes use of digital delay as temporary recording media, permitting a rapid preparation of the AcoustiPrompt messages and insertion of the Acoustiprompt messages in properly timed locations relative to the respective vocal lines. The novel apparatus functions as follows:

(a) The mixed down music and vocal are played back.

(b) The announcer listens to each vocal line and then rapidly articulates each spoken prompt message after he has heard each vocal line. The announcer speaks the spoken prompt into a recording microphone during the song. Thus, the announcer's spoken prompt messages initially occur subsequent in time relative to the respective vocal lines to which they relate.

(c) The apparatus automatically places each spoken prompt message to occur in a particular time precedence relative to the respective vocal line to which the message relates. This may be carried out using any number of channels, preferably two or more. For example, in a four-channel embodiment, the output from the apparatus includes four channels containing the music, the vocal, the AcoustiPrompt messages, all in proper time sequence.

Further editing may be done. However, initial recordings and retakes appear in proper time sequence, greatly speeding up the AcoustiPrompt recording preparation. A good announcer rarely will require further editing. Since the spoken prompt messages need only be clear, rapid, and properly timed. Generally, spoken prompt messages require clarity and do not require musical and artistic qualities. However, some intonation or emphasis indicating the mood and tempo of the song as originally presented by a famous vocalist may be desirable.

FIG. 1 shows a functional block diagram of a system generally indicated at 8 of a novel AcoustiPrompt recording processor embodying the invention and comprising a four-channel first-in/first-out digital audio memory, four channels of input and output amplifiers and associated control circuits.

While FIG. 1 depicts a four-channel system, the system could comprise apparatus having more or fewer channels without departing from the spirit and scope of the invention.

There are five inputs, 10, 12, 14, 16 and 18 in the system 8. Two inputs 12 and 14 (plus possible buffer amplifiers 13 and 15) are for the stereo music channels, one input 16 (plus a possible buffer amp 17) is for the vocal, one input 18 is for the microphone, and one input 10 controlled by a pushbutton 11 is for marking the start of each vocal line. The input 18 as shown may include a microphone feeding into a preamplifier 20 thence feeding a threshold detector 22 and gate circuit 24 to permit level adjustment. Alternatively, the circuit components 18 and 20 may be replaced by an input from a microphone plus a mixing board.

The pushbutton input 10, 11 is used to provide a "marker" signal for the apparatus for indicating that a vocal line is commencing. The operator presses the pushbutton 11 at the commencement of each vocal line to establish a marker signal. Control 26 receives the Vocal Start signal from elements 10 and 11, and notes the time at which the signal is received. The purpose of the signal and the importance of the timing will become evident later.

Control 26 could be any device capable of performing the rudimentary timing tracking and control as discussed herein. Preferably, control 26 is a programmable processor such as the 8080 manufactured by Intel. Programmability allows the system to be modified within the capabilities of the particular processor. Control 26 could also be a hardwired device, or other application specific processor designed to carry out the functions discussed herein.

All audio inputs 12, 14, 16 and 18 are converted to digital signals by respective analog-to-digital converters 32, "A/D", in order to be applied to a plurality of memory circuits 34 which compromise four digital delay lines. The memory circuits 34 comprise, for example, first-in/first-out overwriting solid-state memories, which store the digital audio samples by removably "writing" to given locations within each respective memory in a sequential fashion. At a later interval of time (which occurs after a respective time delay) the respective stored digital signals which were stored in the four respective memories 34 are read sequentially out of the four memories (i.e., are read out of the respective delay lines) and are presented to four respective digital-to-analog converters 36, "D/A". The output signals from these latter converters are the same as the original audio signals 12, 14, 16 and 18, except that they have been delayed in time by temporary storage in the memories 34. The time delay applicable to the first three channels associated with inputs 12, 14 and 16 is the same predetermined time delay for all three of these channels. The time delay for the fourth channel associated with input 18 is automatically varied as will be explained later.

The first-in/first-out overwriting memories (delay circuits 34) may be envisioned as if each overwriting memory is a system in which digital signals enter and propagate from the beginning to the end of a delay line. One characteristic of digital delay line memories is that data can be removed from any section of a particular delay line. Since the time interval can be varied between storing the digital signals and reading out (retrieving) these signals, the effect is like changing the length of each delay line so as to achieve a different delay time. In practice, the respective delay times may be modified simply by changing the number of memory locations being used. It is convenient and illustratively helpful to envision a moveable "read pointer" that changes the effective length of the delay line for the spoken prompt messages and thence to assume that movement of such a read pointer serves to change the delay time of such a delay circuit.

In FIG. 1, a control circuit 26 is shown responsive to marker signals produced by closure of push-button switch 11 for keeping track of marker signals for automatically controlling variable time delays for the respective Acoustiprompt messages. This is carried out by automatically modifying the relative positions of the read pointer (time delay) in the AcoustiPrompt delay line for each spoken prompt message depending upon the desired relation between the vocal or music and the acoustical prompt. The outputs of the four digital-to-analog converters 36 drive four line amplifiers 38. The resultant four audio signal outputs (shown as Left "L" and Right "R" Stereo Music, Vocal and AcoustiPrompt) are now available for monitoring or for analog recording. Also, it is noted that the audio signal data may be left in the digital domain, as distinguished from the analog domain for recording digitally.

The delay line 34 is a "first-in/first-out" memory device that carries four channels of digital signals. The total length of the delay line is predetermined so as to provide a time delay and duration for at least considerably more time than the time duration of the longest vocal line expected to occur. This total predetermined fixed time delay may, for example, be in the vicinity of about 10 to about 20 seconds. The Music Stereo pair L and R and the Vocal signals are all written into the delay line and then are all read from the delay line with this same predetermined fixed length delay time.

Continuing with FIG. 1, a voice-activated sensing system is made up of a threshold detector 22 and an on-off ("start", "stop") switch 30. Switch 30 is used both to activate the microphone circuit and to provide pointer control signals to control 26 regarding beginning and end times of the AcoustiPrompt messages.

System 8 is generally connected to the output of a mixing console (not shown) from which a master tape provides audio signal inputs 12, 14 and 16. The operator has mixed the master tape into a music pair output 12, 14 and a vocal output 16. These signals 12, 14 and 16 are fed into the AcoustiPrompt recorder 8 shown in FIG. 1.

The operation of the Karaoke recording system 8 will now be described with reference to input signals 12, 14 and 16 from a mixing console. The operator/announcer listens to outputs 12, 14 and 16 from the console, which also serve as the inputs to the Karaoke recording system 8 in FIG. 1. As the song is being played, a vocal signal 16 is heard. At the onset of each vocal line, the operator depresses the pushbutton 11. This sends a signal to control 26, which notes internally the time at which the signal is received. The time mark will be explained later with reference to FIGS. 2–5. At this time, then, the vocal line signal 16 and the musical signals 12 and 14 are entering memory 34.

Immediately after the end of each vocal line the announcer rapidly speaks the corresponding spoken prompt into the microphone 18. The digital representation of the rapidly spoken prompt message is written into the prompt message signal storage region of the memory 34. At the conclusion of this rapidly spoken prompt message, the AcoustiPrompt delay read pointer is automatically reassigned. The reassignment is a result of the signals developed by the threshold detector 22, the start/stop switch 30, and the control 26, as will be explained later. This reassignment is such that the end of the rapidly spoken prompt message, as reassigned, will now occur at a particular position relative to the vocal line. For example, the acoustical prompt could be reassigned to be read out slightly before the beginning of the corresponding vocal line of input 16. Alternatively, the prompt could be reassigned to overlap, and lead, the vocal.

FIGS. 2–5 illustrate a four-track embodiment of the automatic reassignment discussed above. It should be kept in mind that the number of tracks could be more or less than four tracks. The individual delay lines corresponding to memory circuits 34 (FIG. 1) are shown in each of FIGS. 2–5. As illustrated, these four individual delay lines are shown as a pair 40 and 42 for the stereo music, a delay line 44 for the vocal, and a delay line 46 for the spoken prompt messages, i.e., for the AcoustiPrompt messages. A delay time equal to the length of the delay line is provided for the stereo music and for the vocal. This predetermined fixed delay is constant for each of the stereo music and vocal. The delay could be, for example, in the range of about 10 to 20 seconds, as previously described. This predetermined fixed delay time is illustrated by the fixed distance between the "WRITE TO MEMORY" and "READ MEMORY" positions 47 and 49, respectively.

It should be kept in mind that while four-channel is illustrated and discussed, such discussion and illustration is for purposes of example only. A system embodying these principles having more or fewer channels is also contemplated without departing from the spirit and scope of the Karaoke systems and methods discussed herein.

The arrow 51 indicates that "time" is increasing toward the right FIGS. 2–5. The read Pointer Position 48 for the AcoustiPrompt memory 46 is variable as illustrated by the movable pointer 48 position (which is "UNDEFINED" in FIGS. 2 and 3). This pointer is controlled by control 26. It should be recognized that delay lines 40, 42, 44, 46 are not necessarily discrete lines, but can be made up of one large memory device 34 (FIG. 1) whose four inputs and four outputs are allocated to respective connections via a multiplex device as is known in the art of first-in/first-out overwriting memories.

FIG. 2 depicts the temporary storage of a vocal line 45 indicated as "vocal" 45. Marker 50 illustrates the time noted by control 26 upon momentarily pressing the button 11 (FIG. 1). Marker 50 is shown as being in the delay line memory for purposes of illustration only. Marker 50 is actually represented internally to control 26.

The song as a whole is propagating along the three delay lines 40, 42 and 44. At the instant in time illustrated in FIG. 2, the announcer/operator has just finished listening to the vocal line 45 and is preparing to speak into the microphone 18 (FIG. 1). There is no spoken vocal prompt message yet recorded in the AcoustiPrompt channel 46.

FIG. 3 represents the delay line only a brief moment later than the time represented in FIG. 2. Just prior to the time illustrated in FIG. 3, the announcer/operator had rapidly spoken the vocal prompt message 53 corresponding to the preceding vocal line 45 (FIG. 2). FIG. 3 shows the temporarily stored, completed, vocal line 45. FIG. 3 also shows a major portion of the announcer's spoken vocal prompt message 53 in the delay line 46.

FIG. 4 represents the delay line status for yet another instant in time which is only a brief moment later than the instant represented by FIG. 3. In FIG. 4 the spoken prompt message 53 is now stored in delay line 46. There are numerous methodologies which could be used to reassign the AcoustiPrompt track relative to the other tracks. Control 26 is capable of tracking the relative timing of the vocal track and AcoustiPrompt, and this tracking data could be used to completely stagger the prompt and vocal tracks, or the prompt could overlap the vocal only partially.

One example of reassigning the prompt is illustrated by FIG. 4. In FIG. 4, the instant of occurrence of the back end 43 of this prompt message 53 is now known by automatic action of the threshold detector 22 (FIG. 1) which has actuated the stop command switch 30. At the instant shown in FIG. 4, a predetermined distance in time of the Marker 50 from the predetermined fixed memory read point 49 is shown by a "delta-t" arrow 55. In this instance, delta-t has been chosen to provide for the entire prompt portion defined by 53 to be read out ahead of the vocal 45. This delta-t value 55 is added to the back end 43 of spoken vocal prompt message 53 (indicated by delta-t arrow 55').

The assignment of the position of the read pointer 48 places the pointer in a "DEFINED" position. Note that the read pointer DEFINED position 48 is closer in time to the beginning-end 41 of the spoken prompt message 53 than the fixed memory read out point 49 is to the beginning-end Marker 50 of the vocal line 45. Consequently, the AcoustiPrompt message 53 will be brought out (read out) from its delay line 46 earlier than the corresponding vocal line 45 will be brought out from its delay line 44. Moreover, the read-out AcoustiPrompt message 53 now will end in real time just before the beginning of the read-out vocal line 45 to which this message 53 corresponds. Thus, the entire AcoustiPrompt message 53 advantageously now will precede in real time the corresponding vocal line 45 as is desired for Karaoke prompting.

Lastly, FIG. 5 represents the status of the delay lines 34 following that shown by FIG. 4. The AcoustiPrompt message 53 is almost entirely read out of delay line 46, while the corresponding vocal line 45 is about ready to commence exiting from delay line 44. The AcoustiPrompt message 53, which actually was created by an announcer/operator after listening to the vocal line 45, has now been displaced in real time so as to occur (become available) at its output 57 (FIG. 1) in appropriate real-time relationships so as to precede in real time the corresponding vocal line 45 which soon will occur (become available) at output 59 (FIG. 1).

Thus, it will be understood that no tape editing was required to create this AcoustiPrompt Karaoke recording wherein spoken prompt messages automatically are reassigned so that they precede in real time relationships the respective vocal lines to which they correspond.

While the above has been carried out using a device of the type demonstrated by control 26, the tracking of timing could be carried out by any device which is capable of recording such information, including hardwired and programmable apparatus.

ACOUSTIPROMPT RECORDINGS

AcoustiPrompt recordings may be placed on any recording medium capable of playing back multiple channels of sound. For example, four channels may contain two stereo music channels, a vocal channel, and a prompt channel. It is to be understood that the two stereo music channels may also include a choral background along with the music, but the lead singer, namely the vocalist, is recorded on "the vocal channel". Home-usage media that are well suited for AcoustiPrompt recordings are: the compact cassette, the rotary digital audio cassette (R-DAT), the digital compact cassette (DCC) and the compact disc (CD).

ACOUSTIPROMPT CASSETTES

A currently commercially available compact cassette, commonly known as a "cassette" or "tape cassette", is a four-track recording medium, with all four tracks recorded side-by-side on a magnetic tape. For the presently marketed music cassette as shown in FIG. 6, the four tracks are recorded with the left and right channels for side A in the forward direction on the tape, generally indicated at 61, followed by the right and left channels for side B which are recorded in the reverse direction on the tape 61.

Figure 6:
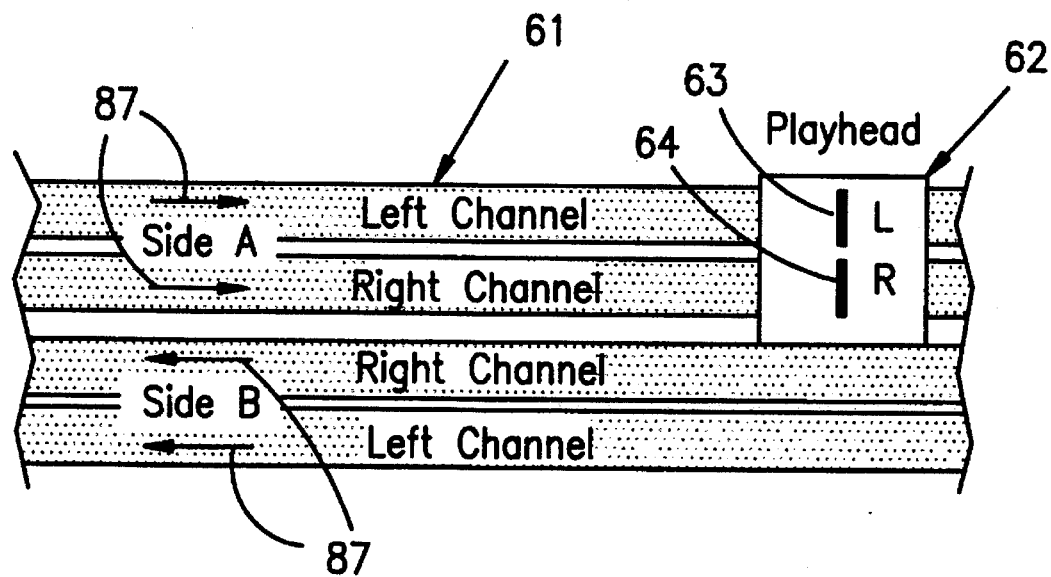
FIG. 6 shows a standard track allocation of a magnetic cassette tape for use with a standard magnetic playhead of a standard cassette tape player.

FIG. 6 depicts a cassette tape 61 with the usual allocations for all four recorded channels. For example, shown is the "oxide coated" side of a section of tape 61 which is 0.150 of an inch wide (150 mil tape). The four recorded tracks are shown as the four elongated shaded areas, illustrated with respective legends: "LEFT CHANNEL", "RIGHT CHANNEL", "RIGHT CHANNEL" and "LEFT CHANNEL". The playback head 62 is depicted in FIG. 6 as having two playhead gaps 63 and 64, "L" and "R", respectively, for reading the respective left and right channels.

The playback head 61 (FIG. 6) with two gaps for reading two channels initially is positioned to read (to play) the recordings for the left and right channels in the forward direction, shown by arrows 87, which is "SIDE A". In order to play the reverse direction shown by arrows 87a, i.e., "SIDE B", the cassette as a whole is removed from the tape Player, turned over, and reinserted. The tape will then become transported in the correct forward direction for playback on the same stationary stereo head with its two gaps 63 and 64 (L and R) for playback of the respective left and right channels of SIDE B.

Thus, it will be understood that a currently commercially available cassette tape 61 (FIG. 6) is presently arranged or partitioned with respective allocations as a four-channel recording medium. All four allocated channels are located on one and the same oxide-coated surface of the tape 61. Consequently, a presently commercially available 150 mil tape 61 advantageously can be employed for an AcoustiPrompt recording by recording all four channels in the same forward direction as is shown in FIG. 7 by four forward arrows 87, and this AcoustiPrompt cassette tape is indicated by the reference number 65.

Figure 7:
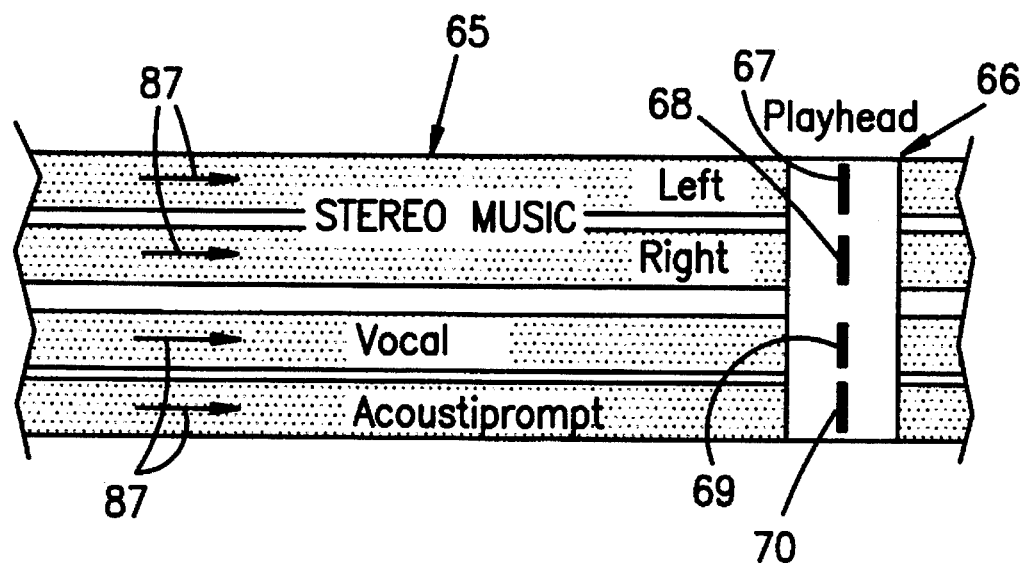
FIG. 7 illustrates the AcoustiPrompt track and music assignments and the magnetic playhead arrangement for using a cassette tape in accordance with the present invention.

As an example of this adaption of a commercial cassette tape 61 for providing a four-track AcoustiPrompt tape 65, the following channel track assignments may be used as is shown in FIG. 7: top to bottom; "LEFT STEREO MUSIC" channel, "RIGHT STEREO MUSIC" channel, VOCAL channel, and the AcoustiPrompt message channel.

As shown in FIG. 7, to play back this novel AcoustiPrompt cassette tape 65, a special four-channel playback head 66 is used. The head 66 contains all four transducers and their respective gaps 67, 68, 69 and 70 in correct vertical alignment. In this way all four channels of the AcoustiPrompt recording are simultaneously played back all in the forward direction and all with their proper time alignment.

It should be noted that the four channel playback head for the AcoustiPrompt cassette may be converted to playback a standard stereo cassette by "turning off" the signal output from the two gaps 69 and 70 in FIG. 7. This is shown by the switch 71, which is depicted to be in the AcoustiPrompt setting. Thus, the four channel player for the AcoustiPrompt cassette may be made fully compatible with the conventional cassette.

It is also contemplated that the AcoustiPrompt could be implemented using just two tracks of the standard cassette format. That is, various mixes could be provided to lay down the AcoustiPrompt, vocal track, and instrumentals, on two tracks. By using balance or other mixing controls a variety of effects could be provided to convey the AcoustiPrompt.

It is further contemplated that the recording may or may not have the vocal line which typically accompanies the music. That is, the music could be recorded alone on one track, and the AcoustiPrompt could be recorded on the other.

Furthermore, the tracks need not be entirely separate in content. For example, the AcoustiPrompt, music, or other recordings could be mixed across combinations of tracks. This would provide a variety of alternatives with respect to how the recording is output. Such mixing would provide an opportunity to use combinations of faders and mixers on the signals from each track to enhance the overall effectiveness of the acoustic prompting.

Standard procedures can be employed to manufacture Karaoke cassettes containing AcoustiPrompt recordings. Presently, pre-recorded music cassettes including a tape 61 (FIG. 6) are manufactured from master recordings that contain all channels as previously described. All channels are simultaneously recorded in one traverse of the cassette tape 61. For example, the forward music, SIDE A, and the backward music, SIDE B, are played simultaneously from the master recording by means of a four-channel play head. Thus the forward and backward music of SIDE A and SIDE B, respectively, are recorded onto the cassette tape 61 in one traverse of this tape by employing a four-channel record head. Consequently, utilizing an AcoustiPrompt master recording in a standard recording procedure desirably will result in manufacturing Karaoke cassettes with tapes as shown at 65 having the stereo music channels, the vocal channel and the AcoustiPrompt message channel properly duplicated from the master recording in readiness to be played back all in the same forward direction 87.

Modern cassette manufacturing is also carried out with digital masters. The master program is stored in memory in digital form and is played back repeatedly into the cassette tape recorder for producing multiple duplications. These standard digital recording procedures may also be used for manufacturing tapes containing AcoustiPrompt Karaoke songs.

Interactive, multimedia Karaoke programs utilizing Chroma-key, Blue Screen, and digital effect features may also be designed so that a Karaoke home entertainment system could feature interposing PC compatibility.

It is also contemplated that conventional Karaoke could be retrofitted to provide acoustic prompting from the information which is used to generate the visual prompt. This involves simple text to speech circuitry.

ACOUSTIPROMPT R-DAT

A rotary digital audio tape (R-DAT) system is a relatively new but standard recording and playback medium available to both professionals and non-professional consumers. The tape consists of a small cassette, not unlike the present music cassette tape currently used for analog recording and analog play back. This R-DAT tape is played back in players that can be placed in a two-channel or four-channel mode with many options of fidelity and playback time. For the Karaoke AcoustiPrompt system, the R-DAT player could be used in either the two or four channel mode.

An R-DAT recorder/player utilizes rotary scanning head techniques, similar to a VCR, to record and to read oblique narrow tracks on a relatively slowly moving tape. The digital data on the tape contains the music information, the assigned channel, and other information about the music, timing, bands, and copyright protection, etc. Commercial pre-recorded R-DAT tapes are available; they are recorded with a given format and digital coding so as initially to be equal to the high fidelity characteristics of a compact disc ("CD") recording.

Four channels are allocated for Karaoke recording in an R-DAT recorder/player: channels 1 and 2 may be used for left and right stereo music (with choral accompaniment, if any) channel 3 may be used for the lead vocalist, namely the vocal track, and channel 4 may be used for the AcoustiPrompt message track. This allocation of a total of four R-DAT channels, namely two channels respectively for vocal and for prompt messages, separate from the two music channels in the present adaptation of an R-DAT recorder/player for AcoustiPrompt Karaoke reduces the playing time of an R-DAT cassette to one-half of the time normally available in an R-DAT cassette for conventional pre-recorded music products which employ only two channels.

The R-DAT cassette may also be used to implement the two track AcoustiPrompt format as discussed above.

ACOUSTIPROMPT CD

A compact disc ("CD") is a familiar optical digital storage medium used for pre-recorded music. It contains the capability to be used as a two- or four-channel storage medium, but at present it is configured only to be used for two-channel stereo sound.

A compact disc is a sequential disc medium with the data stored in a long spiral of position-modulated points. The music data and the respective channel, the timing and track assignments, and the selection data are all stored in the data stream. Playback of a compact disc involves the reflection of a focused laser beam of light as the compact disc is rotated.

In order to play back two additional channels, thus being a total of four channels, the CD's data rate must be increased if the sound fidelity is to be maintained. Such four-channel play back can be accomplished by a variety of means. For instance, the rotating speed may be raised, the data density may be increased, the number of bits assigned for each audio sample could be lowered, the number of samples per second could be lowered, the AcoustiPrompt channel could utilize a much lower sampling and coding rate than the music and vocal channels. An AcoustiPrompt Karaoke CD player would require appropriate modifications for correct playback of four channels.

KARAOKE ACOUSTIPROMPT PLAYERS

Figure 8:
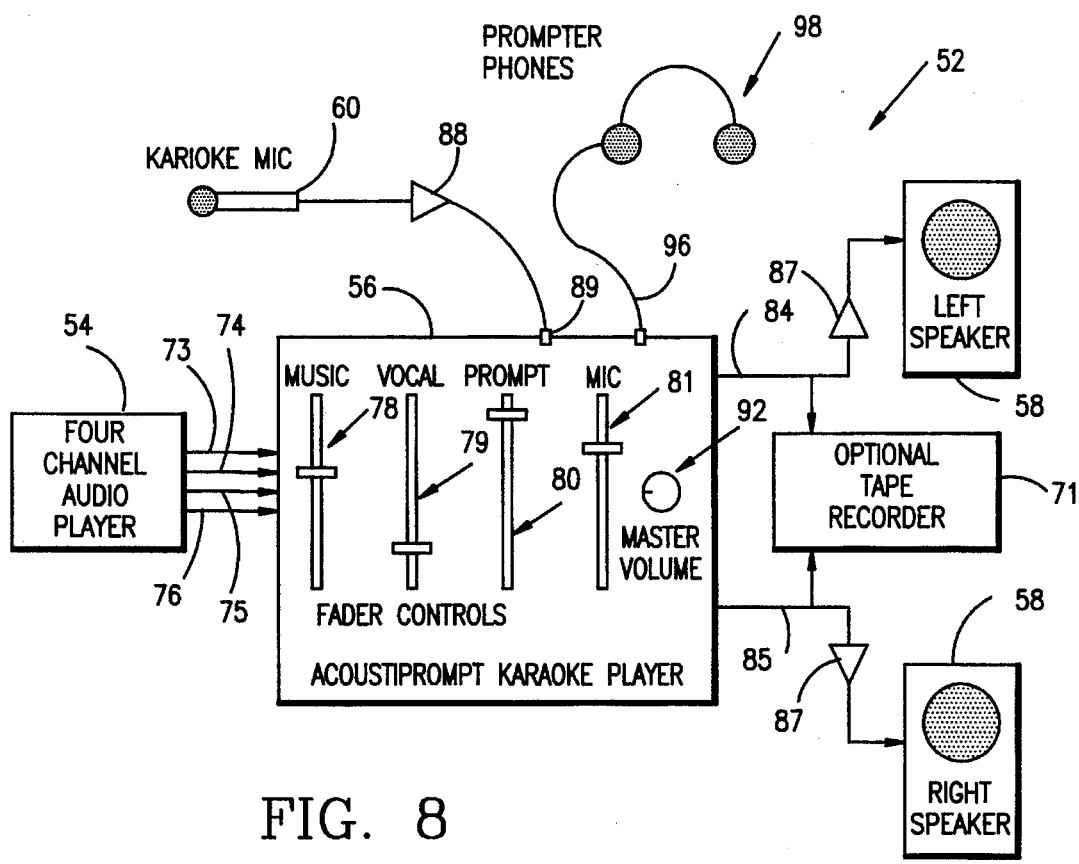
FIG. 8 illustrates a block diagram of a possible AcoustiPrompt player system in accordance with the present invention.

To take full advantage of AcoustiPrompt Karaoke, a special player/mixer/amplifier is desirable, as now will be described. A special AcoustiPrompt player system 52 is shown in FIG. 8. This Basic AcoustiPrompt Player System 52 includes a four-channel recording medium playback device 54: for example, this four-channel audio player 54 may comprise: a special cassette deck with a four-gap playback head 66 (FIG. 7), an R-DAT deck, or a special CD player. The output of each of the four channels is applied to a mixer 56 which permits the four respective signals to be added together in a controlled and specified manner. The resulting stereo signal is then presented through leads 84 and 85, respectively, to a power amplifier 89 and loudspeakers 58. Additionally, there can be a microphone attachment 60 so that a Karaoke participant can amplify his or her voice over the same sound system. Also, as an option, there may be a recording device 71 connected to the leads 84 and 85 for recording the Karaoke participant's rendition with the music.

In order fully to utilize the advantage of the AcoustiPrompt techniques, the Karaoke participant will likely want to be able to adjust the level of all inputs being fed into the mixer: namely, inputs of music, vocal, prompt and Karaoke microphone. Thus, fader controls 78, 79, 80 and 81 are shown provided in the mixer 56 respectively for "MUSIC", "VOCAL", "PROMPT" and "MIC". There is also a "MASTER VOLUME" control 92. These fader and volume controls permit tailoring the resulting sound to the necessary requirements for learning the lyrics, for practicing the vocal to emulate the original, and for adjusting the resultant sound for desired musical balance.

It is noted that the AcoustiPrompt Karaoke playback system 52 (FIG. 8) comprises an integrated, assembled unit. For example, such a system could comprise a portable unit, a desktop unit or an automobile player. Also, this AcoustiPrompt Karaoke playback system 52 may comprise suitable separate components, a musical instrument device complete with loudspeakers, or may comprise part of a stereo entertainment system, or even may comprise a stage system for hands-free and visual-prompter-free performances.

MEDIA PLAYER

The four-channel audio player source 54 (FIG. 8) can be any appropriate cassette player, R-DAT player, CD player, CD-ROM, reel-to-reel tape player, laservision player mechanism, or any four-channel media that involves a multi-channel communication link 73, 74, 75 and 76 or the source 54 may be a multi-channel signal of a song which is being played back from memory storage.

Figure 9:
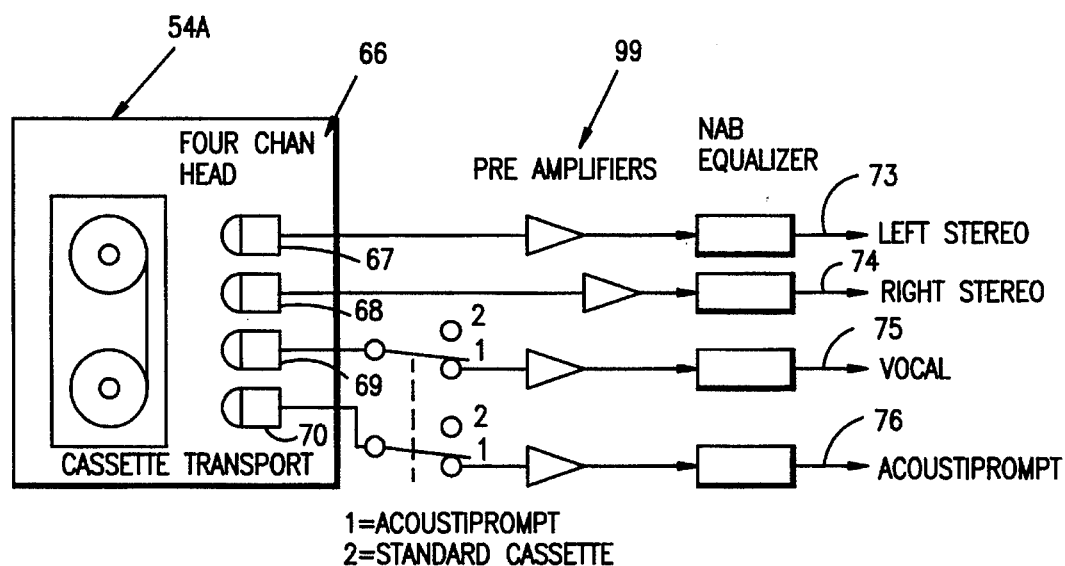
FIG. 9 illustrates the use of a cassette player with a novel four-track channel playhead for use in an AcoustiPrompt Karaoke performance.

As shown in FIG. 9, a cassette player 54A for a tape recording 65 of an AcoustiPrompt Karaoke performance requires a four-channel play head 66 and a four-channel equalized preamplifier 73. The outputs 73, 74, 75 and 76 from the four-channel equalized preamplifier 73 are applied to the mixer section 56 (FIG. 8).

A conventional R-DAT player is already configured to permit the playback of four channels. Its four line outputs are applied directly to the mixer section 56 (FIG. 8).

A CD player which is used for AcoustiPrompt Karaoke is a special device that allows the simultaneous playback of multiple channels of audio from a special AcoustiPrompt CD. Its four line outputs are applied directly to the mixer section 56 (FIG. 8).

There are a variety of additional media available for multi-channel playback. Presently, the CD's optical disc has been configured for the multi-media use of the CD-ROM, the CD-Video, and the CD-Interactive. A new Digital Compact Disc, or DCC, has been introduced as the eventual replacement for the cassette. This DCC medium can also be configured for four-channel simultaneous playback. The four-channel output from each such player can be applied directly to the mixer section 56 (FIG. 8) for an AcoustiPrompt Karaoke performance.

MIXER SECTION

Figure 10:
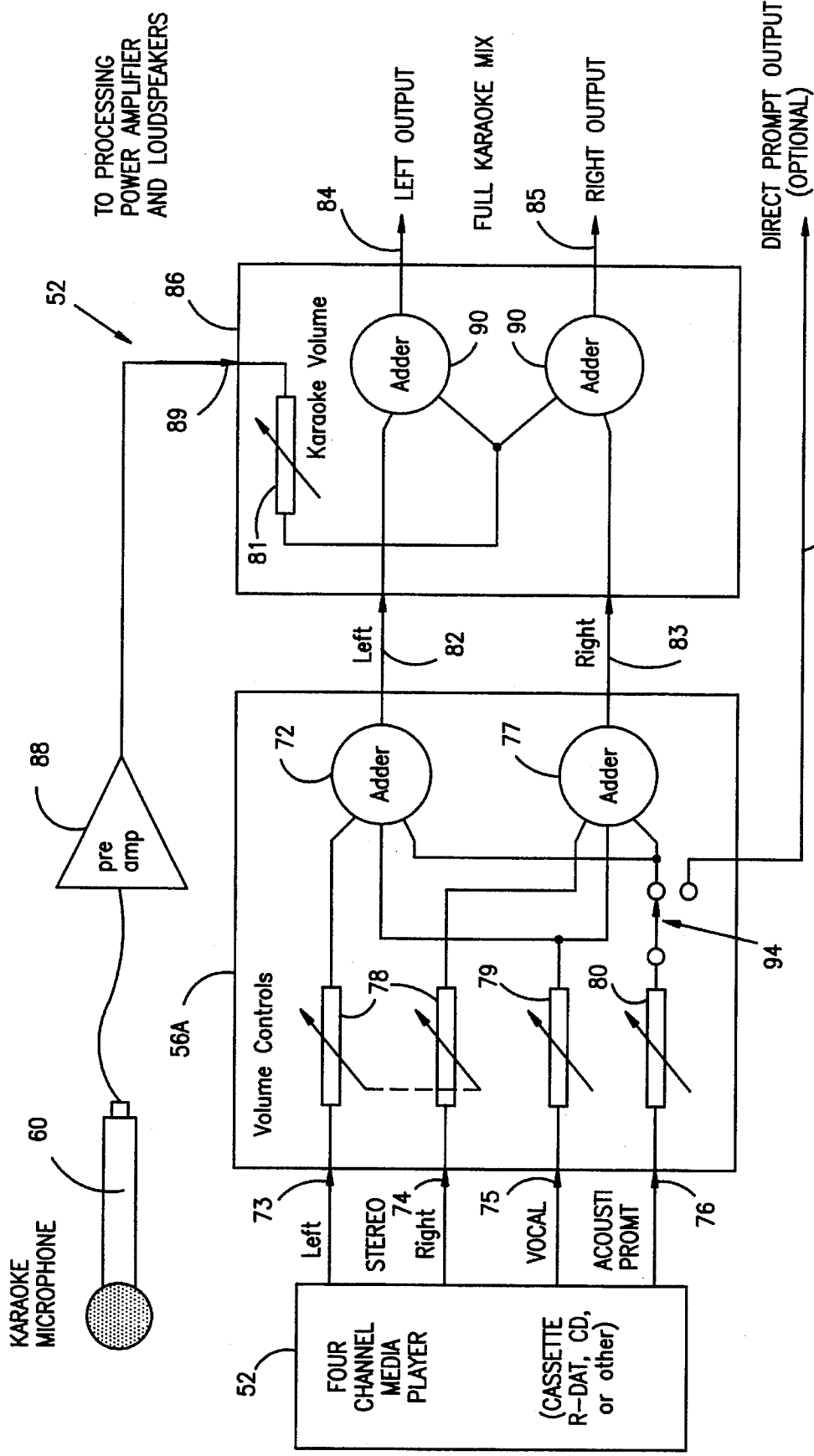
FIG. 10 is a schematic block diagram illustrating a mixer selection for an AcoustiPrompt Karaoke playback device.

FIG. 10 shows in greater detail an example of a suitable mixer section 56A for an AcoustiPrompt Karaoke playback system 52. Two inputs 73, 74 from the stereo music (and possible accompaniment) channels drive an electronic adder 72 and 77 through a stereo volume control 78. This stereo volume control 78 adjusts both left and right channels simultaneously with "ganged" potentiometers, as shown by the dashed line. The inputs 75 and 76 from the vocal track and the AcoustiPrompt track, respectively, drive the adder 72 and 77 through separately adjustable volume controls 79 and 80, respectively.

Volume controls 78, 79 and 80, often called "faders" on a "mixer" 56 (FIG. 8), permit changing the level from "off" to full "on". Thus, with reference both to FIGS. 8 and 10, the "MUSIC" FADER CONTROL 78 (FIG. 8) corresponds with the stereo volume control 78 (FIG. 10); the "VOCAL" FADER CONTROL 79 (FIG. 8) corresponds with the volume control 79 (FIG. 10); and the "PROMPT" FADER CONTROL 80 (FIG. 8) corresponds with volume control 80 (FIG. 10). A Karaoke volume control 81 in FIG. 10 corresponds with the "MIC" FADER CONTROL 81 (FIG. 8) in the mixer 56. Therefore, each source: the stereo music 73 and 74, the vocal 75, and the AcoustiPrompt messages 76 may be listened to alone, or any one of them may be listened to with another (or with others) or all of them may be listened to together. The relative level of each may be adjusted by the mixer 56 to suit the intent and the desired listening result.

The electronic adders 72 and 77 serve to combine appropriate inputs from the four channels 73, 74, 75 and 76. The left and right stereo music (and possible accompaniment) are added respectively to the left and right output channels 82 and 83 (FIG. 10). The vocal track 75 is added in equal amounts to the left output channel 82 and to the right output channel 83 to effectively create a "center phantom". Such creation of a center phantom is employed for all modern stereo recordings and synthetically corresponds to a "mono" or vocal track. The AcoustiPrompt channel 76 is also added in equal amounts to both the left and the right output channels 82 and 83. As shown in FIGS. 8 and 10, the volume or level of each of these inputs 73, 74, 75 and 76 can be varied individually by their respective controls 78, 79 and 80.

The Karaoke participant sings along with the program into a microphone 60 and adds his or her voice to the final output 84, 85 from the whole player system 52. An additional mixer stage 86 introduces the amplified microphone audio input 89 into the final two-channel 84, 85 Karaoke mix, by adding equally to the incoming left and right channels 82, 83 to create a center phantom. The Karaoke participant's microphone 60 drives a preamplifier 88 and the volume of the input 89 from this preamplifier 88 is adjustable by the Karaoke volume control 81. The microphone audio input 89 is therefore mixed by adders 90 with the income stereo sound signals 82, 83 resulting from fader control and mixing of the stereo music channels 73, 74, the vocal channel 75, and the AcoustiPrompt channel 76. The resultant two channel Karaoke mix output 84, 85 then contains all four signals from the Karaoke source 52, plus the sing-along vocal from a Karaoke participant using the microphone 60. It is to be understood that the mixer 56 (FIG. 8) may include within itself a mixer stage such as shown at 86 (FIG. 10). Also, this mixer stage 86 (FIG. 10) may include a master volume control 92 (FIG. 8).

Figure 11:
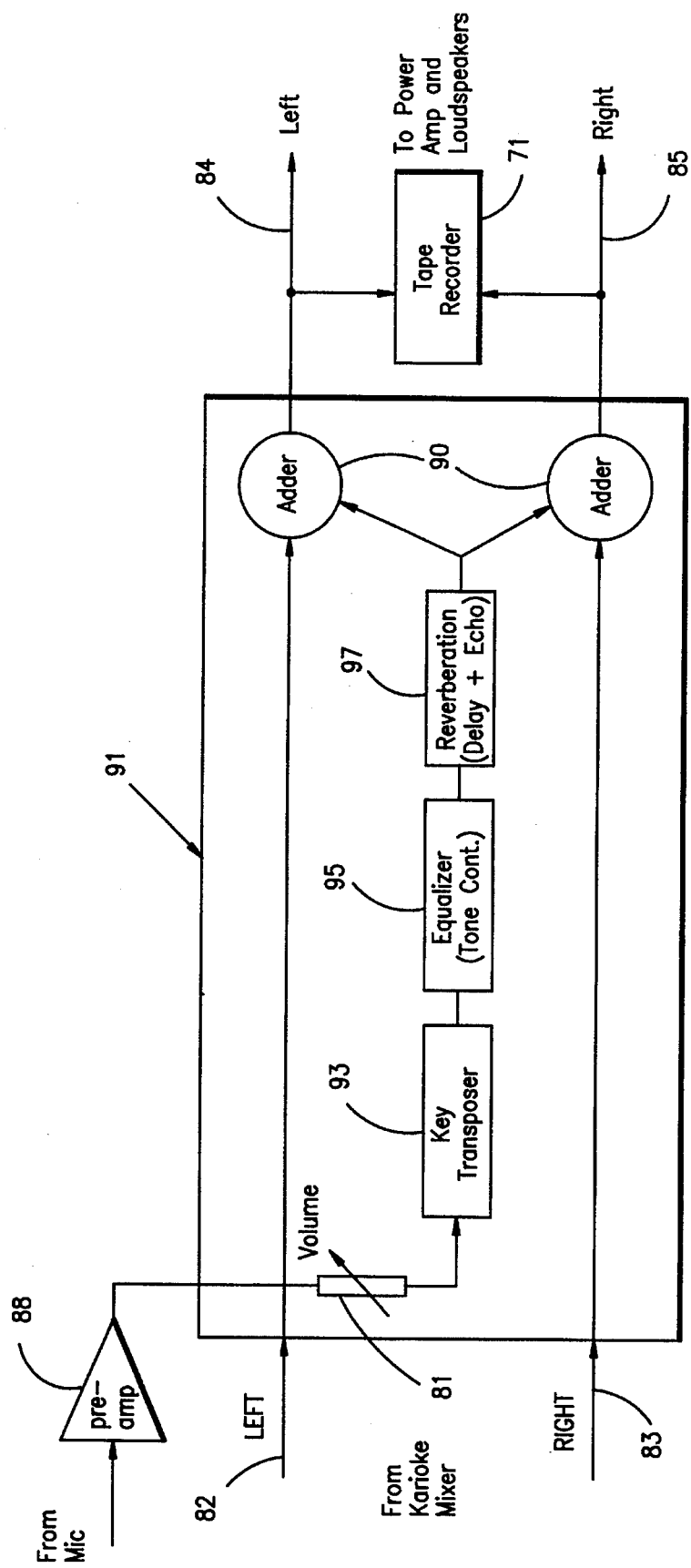
FIG. 11 is a block diagram illustrating additional processing and recording for a Karaoke system embodying the present invention.

The output 84, 85 from the entire AcoustiPrompt Karaoke player and mixer system 52 drives a power amplifier 87 connected to the loudspeakers 58 (FIG. 8), and a master volume control 92 (FIG. 8 or 10) controls the signal level of the output 84, 85. Whatever additional processing circuitry is desired may be included in the mixer 56, 56A and 86 such as tone controls, balance, reverberation, etc., for example as is illustrated in FIG. 11. In addition, the output from the mixer 56, 56A and 86 may be connected to another tape recorder deck 71 (FIGS. 8 and 11) to permit recording the resulting Karaoke mix.

An arrangement of such additional processing circuitry 91 is shown in FIG. 11. As shown in FIG. 11, the additional processing circuits for Karaoke recording may comprise a musical key transposer 93, a tone control equalizer 95, and reverberation circuits 97, which provide delay and echo effects.

The output from the Karaoke player 52 (FIGS. 8 and 10), plus processing circuitry 91 (FIG. 11) if desired, can be listened to directly from the loudspeakers 58 (FIG. 8) and/or the sound may be recorded by a suitable recorder, as indicated at 71 (FIGS. 8 and 11) onto tape or digital tape for later listening. These two features of (1) loudspeaker listening and (2) recording enable a Karaoke participant who is using the microphone 60 (FIGS. 8 and 10) to practice a rendition repeatedly and to make recordings of each rendition.

The AcoustiPrompt player system 52 plus processing equipment 91, if desired, enables a Karaoke participant to become accomplished in a particular song through listening, lyric learning, vocal practice, mixing developments, live sound, and through repeatedly recording the performance for later playback and critiquing. Then, a final recording, if desired, can be made of the best rendition performed (the most accomplished performance) by the Karaoke participant. The AcoustiPrompt player 52 (FIGS. 8 and 10) and the AcoustiPrompt recorder 8 (FIG. 1) make such a Karaoke accomplishment conveniently possible for an amateur participant without entailing the significant expense and awkward embarrassment of a novice Karaoke enthusiast attempting to employ a commercial sound recording and mixing studio.

OPERATING EXAMPLE OF KARAOKE PRACTICE

The stereo music and the accompaniment channels 73, 74 may be listened to with the vocal track (the original vocalist's singing) being added in via channel 75. This initial listening may involve the original song with the original vocalist. This initially heard musical performance now is to be emulated by a Karaoke participant who is practicing to become proficient. First, he or she must learn the words. The AcoustiPrompt volume can be raised by operating the volume control 80 (FIGS. 8 and 10), and the prompt messages 53 (FIGS. 3, 4 and 5) can be listened to alone without listening to the music or vocal by turning fully down the volume controls 78 and 79 (FIGS. 8 and 10).

Next, the music on channels 73, 74 and AcoustiPrompt messages on channel 76 are played back while the vocal volume control 79 may be raised partway so that each vocal line, as sung by the vocalist, is heard after the respective preceding AcoustiPrompt message 53. This partway raising of the volume control 74 for the vocal channel 75 enables the Karaoke participant to hear the vocal channel while practicing singing the respective vocal lines simultaneously along with the same vocal lines being provided by a recording previously made of an outstanding vocalist who was singing exactly the same vocal lines.

After the Karaoke participant has mastered the words involved in each line of the vocal, he or she may continue to practice singing along, while the vocal track volume control 74 is progressively reduced in level. In effect, the Karaoke participant is gaining in confidence, and thus is encouraged in progressively more and more substituting his or her own personal singing performance in place of the original vocalist's singing, as the vocal channel volume control 79 is progressively lowered. Next, the level of the AcoustiPrompt messages may be reduced by lowering the prompt volume control 80 as the participant advances in proficiency of singing the words of the song.

Finally, the sound issuing from the loudspeakers 58, 58 contains only the music and accompaniment coming from channels 73 and 74, plus the sound of singing by the Karaoke participant using the microphone 60. The result is a Karaoke performance output which was developed and practiced without involving any visual prompts nor any reading of words.

STAGE KARAOKE

The AcoustiPrompt Karaoke player 52, plus processing equipment 91 if desired, can also be configured as a stage system that enables a participant to hear the prompt messages and to add his or her voice to the mix. If a switch 94 in FIG. 10 is in its down position, the output channels 73, 74 and 75 from the AcoustiPrompt Karaoke player 52 drive the mixer 56A and the final mixer stage 86; however, the AcoustiPrompt signal on channel 76 is not being added in, because the switch 94 is now feeding an output communication link 96, for example an electric cable leading directly to suitable audio prompt means, for example such as earphones 98 (FIG. 8). Thus, the AcoustiPrompt channel 76 may be applied solely to the participant's personalized listening system 98. This personalized listening system 98 may be in the form of an earphone or local loudspeakers mounted on the shoulders of the Karaoke participant. By means of such a cable link 96 or, if desired by means of a radio communication link which may be provided between the player 72 and the personalized listening system 98, the prompt messages are brought directly to the participant without these prompt messages being heard by an audience.

The stereo music and accompaniment final mix output 84, 85 is applied through power amplifiers 87 to the stereo loudspeakers 58 and/or the final mix output 84, 85 is fed to the final two-channel recorder 71. The participant's microphone audio input 89 is added into the final output mix 84, 85. As the AcoustiPrompt Karaoke tape in the player 52 is played back, the participant listens to the music being provided through channels 73, 74 and coming from the loudspeakers 58; he or she also hears the AcoustiPrompt messages being provided through channel 76 and feeding through the switch 94 and through communication link 96 to the personal listening device 98 and thus the participant is able to sing the lyrics knowledgeably. The Karaoke participant's vocalization through microphone 60 and the music from channels 73 and 74 are applied to the loudspeakers 58 and/or recorded by a recorder 71. In this Karaoke performance method, the Karaoke participant advantageously does not require any visual prompts and thus avoids the inhibitions and other associated problems caused by gazing intently at a visual prompter.

Figure 12:
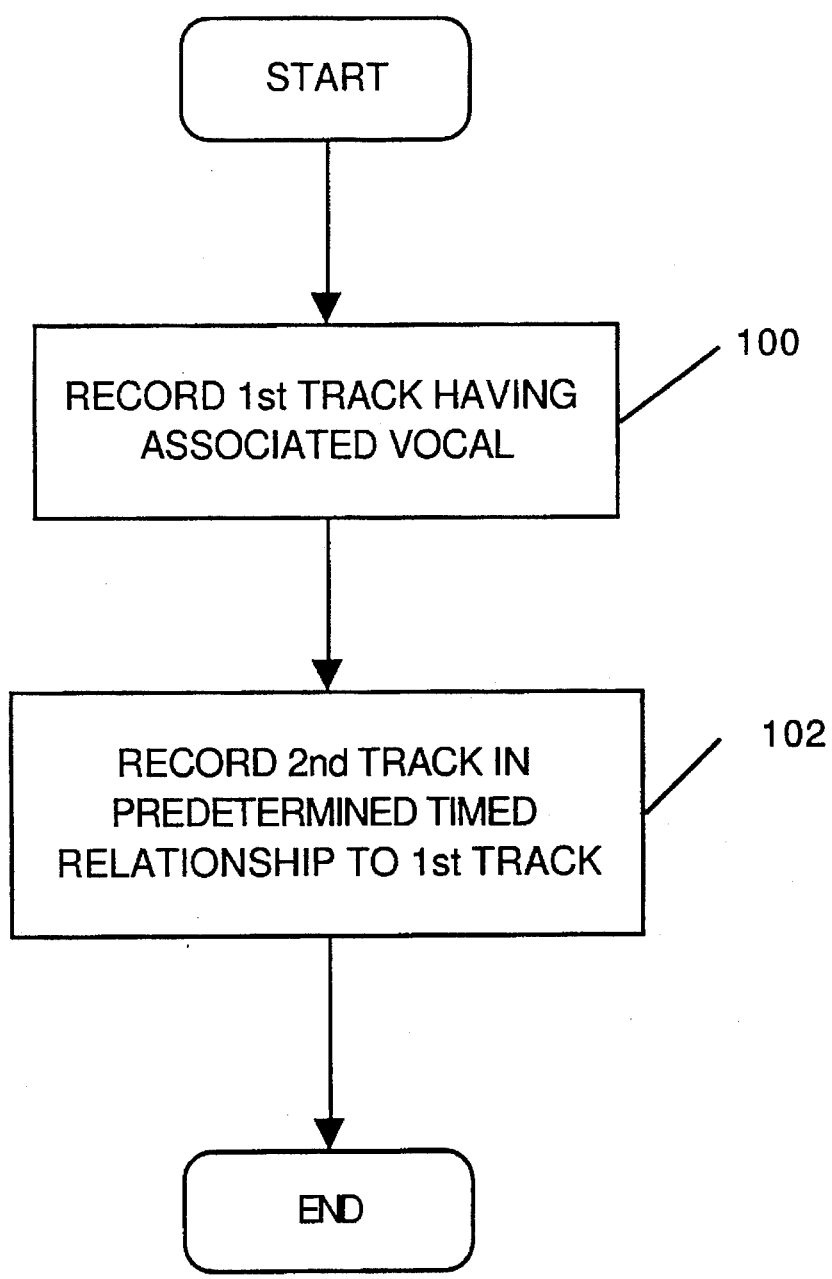
FIG. 12 is a flowchart illustrating a method of recording a first track having an associated vocal and a second track in a predetermined timed relationship to the first track, which embodies the present invention.

FIG. 12 is a flowchart illustrating a method of recording a first track having an associated vocal and a second track in a predetermined timed relationship to the first track, as discussed in detail above with respect to FIGS. 1–11. The first step of the method involves recording a first track having an associated vocal (100), and then recording a second track in a predetermined timed relationship to the first track (102). The first and second tracks may be tracks may be sung, spoken, or in a particular language or languages, as discussed above.

Figure 13:
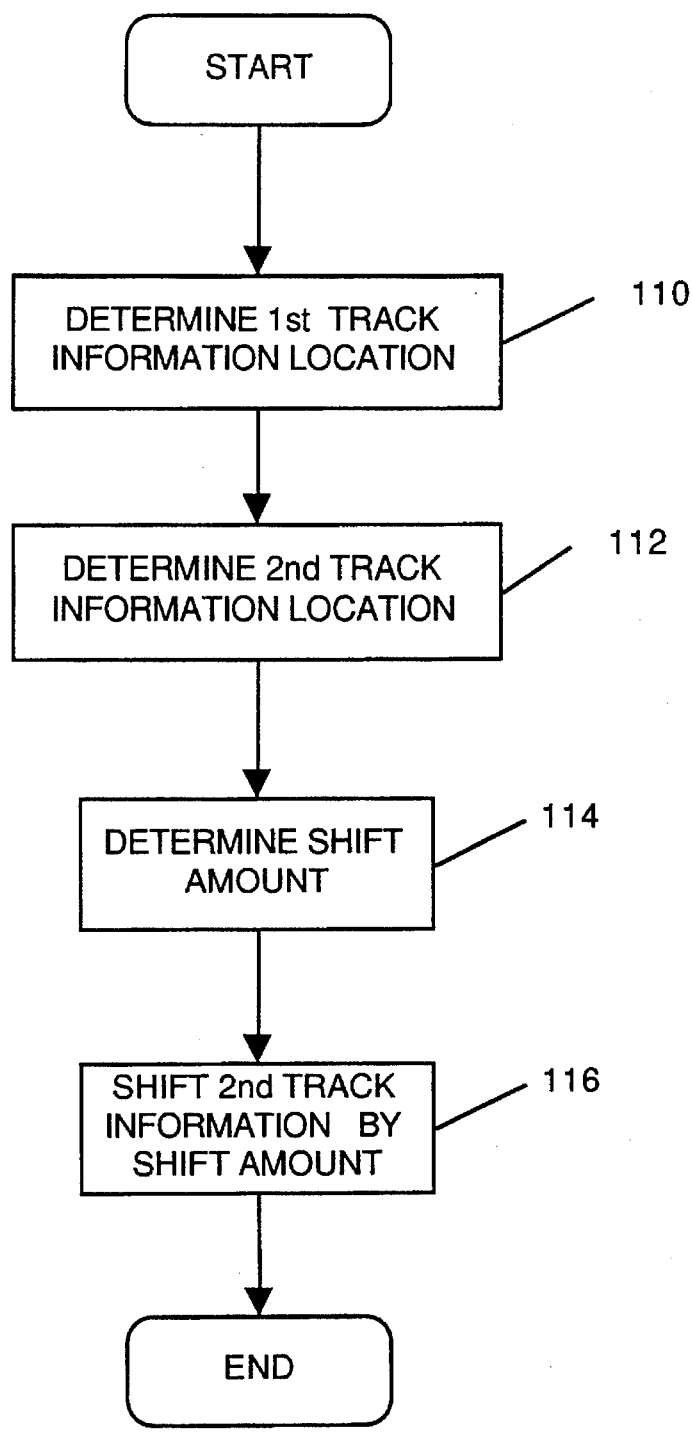
FIG. 13 is a flowchart illustrating finding a location of information on a first track, finding location of information on a second track, and time shifting information in response to the found locations.

FIG. 13 is a flowchart illustrating finding a location of information on a first track (110), finding location of information on a second track (112), determining a shift amount (114) and time shifting information based on the shift amount (116). FIG. 13 shows method steps which may be considered as implementation of FIG. 12. That is, FIG. 12 shows the overall method steps of recording first and second tracks in a predetermined timed relationship, and FIG. 13 details a method for determining the timed relationship. This method has been discussed above in detail with respect to FIGS. 1–12. Note especially the above discussion regarding control circuit 26, which is responsive to marker signals for automatically controlling time delays, and threshold detector 22, and management of the read and write pointers. FIGS. 2–5 explain the resulting recordings from the apparatus and method.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. A method of recording comprising:

recording a first track of audio information having an associated vocal accompaniment;

recording a second track of audio information in a predetermined timed relationship relative to the associated vocal accompaniment by automatically determining timing of said first track of audio information relative of said second track of audio information, and having a linguistic meaning related to a linguistic meaning of the associated vocal accompaniment;

specifying at least one location of information in said first track;

specifying at least one location of information in said second track; and receiving said locations and specifying a time shift amount used in time shifting said second track.

2. The method of claim 1, wherein said recording a second track further comprises recording a spoken vocal.

3. The method of claim 1, wherein said recording a second track further comprises recording a sung vocal.

4. The method of claim 1, wherein said recording of said first and second tracks further comprises recording one of said tracks including a sung vocal, and the other of said tracks including a spoken vocal.

5. The method of claim 1, wherein said recording of said first and second tracks further comprises recording one of said tracks including a sung vocal, and the other of said tracks including a sung vocal.

6. The method of claim 1, wherein said recording of said first and second tracks further comprises recording a vocal of each track in a different language.

7. The method of claim 6, wherein said recording of said first and second tracks further comprises recording one of said tracks including a sung vocal, and the other of said tracks including a spoken vocal.

8. The method of claim 6, wherein said recording of said first and second tracks further comprises recording one of said tracks including a sung vocal, and the other of said tracks including a sung vocal.

9. The method of claim 1 wherein said recording of said second track comprises time shifting said second track relative to said first track.

10. The method of claim 1 wherein said recording includes storing at least one of said tracks in a memory.

11. An apparatus for recording comprising:

means for recording a first track of audio information having an associated vocal accompaniment;

means for recording a second track of audio information in a predetermined timed relationship relative to the associated vocal accompaniment by automatically determining timing of said first track of audio information relative to said second track of audio information, said second track including information having a linguistic meaning related to a linguistic meaning of the associated vocal accompaniment; and means for specifying at least one location of information on said first track, for specifying at least one location of information in said second track, and for specifying, from said locations, a time shift amount used in time shifting said second track.

12. The apparatus of claim 11, further comprising means for receiving information to be recorded on each track; and means for time shifting said second track of information to be recorded relative to said associated vocal accompaniment.

13. The method of claim 12 wherein said means for receiving comprises a memory.

14. The apparatus of claim 11, further comprising means for tracking locations of information in each track.

15. The apparatus of claim 14, wherein said means for tracking comprises means for automatically determining the start and end of information recorded on said second track.

16. The apparatus of claim 11, wherein said means for recording a second track further comprises means for recording a sung vocal.

17. The apparatus of claim 11, wherein said means for recording a first and second track further comprises:

means for recording one of said tracks including a sung vocal, and means for recording the other of said tracks including a spoken vocal.

18. The apparatus of claim 11, wherein said means for recording a first and second track further comprises:

means for recording one of said tracks including a sung vocal, and means for recording the other of said tracks including a sung vocal.

19. The apparatus of claim 11, wherein said means for recording first and second tracks further comprises means for recording a vocal of each track in a different language.

20. The apparatus of claim 19, wherein said means for recording a first and second track further comprises:

means for recording one of said tracks including a sung vocal, and means for recording the other of said tracks including a spoken vocal.

21. The apparatus of claim 19, wherein said means for recording a first and second track further comprises:

means for recording one of said tracks including a sung vocal, and means for recording the other of said tracks including a sung vocal.

* * * * *